United States Patent
Hanseder (10) Patent No.: US 6,253,160 B1
(45) Date of Patent: *Jun. 26, 2001

(54) METHOD AND APPARATUS FOR CALIBRATING A TOOL POSITIONING MECHANISM ON A MOBILE MACHINE

(75) Inventor: Anthony Hanseder, Santa Clara, CA (US)

(73) Assignee: Trimble Navigation Ltd., Sunnyvale, CA (US)

( * ) Notice: Subject to any disclaimer, the term of this patent is extended or adjusted under 35 U.S.C. 154(b) by 0 days.

(21) Appl. No.: 09/232,432

(22) Filed: Jan. 15, 1999

(51) Int. Cl.$^7$ .............................. G01S 5/02; G01S 3/02; H04B 7/185

(52) U.S. Cl. ................. 702/95; 342/357.08; 342/357.17; 342/457; 702/94

(58) Field of Search ........................ 342/357.05, 357.17, 342/450, 457; 702/94, 95; 701/50

(56) References Cited

U.S. PATENT DOCUMENTS 3,815,250   6/1974   Roodvoets et al. .
4,221,483   9/1980   Rando .

(List continued on next page.)

FOREIGN PATENT DOCUMENTS 0219767   4/1987   (EP) .
0223043   5/1987   (EP) .

(List continued on next page.)

OTHER PUBLICATIONS

Brown, Steve, "Automatic Excavator Control. Laser Technology Enables Excavator Operators to Obtain Fast, Pinpoint Control of Slope, Depth and Material Placement," *Equipment Today*, Jun. 1998, pp. 16–18.

Ries, Richard, "Topcon in 3–D", *Equipment World*, Mar. 1998, p. 27.

Moore, Walt, "Grade–Control System Creates Virtual Stringline: Topcon's New System is aimed at Improving Productivity by Eliminating Staking and Checking", *Construction Equipment*, Mar. 1998, vol. 97, No. 3, pp. 105.

Larry Stewart, "Three–Dimensional Control Replaces Stakes, String Lines," *Construction Equipment*, p. 85.

Description of Topcon GRT–2000, Construction Equipment, "Equipment Ideas."

Advertisement for Topcon Corporation, International Construction, Mar. 1998, vol. 37, No. 3.

Advertisement for Topcon Corporation, "Enter a New Dimension of Grade Control," Equipment World, Jul. 1998.

Advertisements, Construction Monthly, p. 45, May 1998.

Advertisement for Topcon Corporation, "Cubrimos un Mundo de Aplicaciones," Construccion y Obras Publicas Latinoamerica, vol. 5, No. 5, Aug. 1998.

Advertisement for Spectra Precision, "Laser–Based Technology for Your Down–to–Earth Problems," Construction & Public Works Asia, vol. 5, No. 5, Aug. 1998.

*Primary Examiner*—Thomas H. Tarcza
*Assistant Examiner*—Fred H. Mull
(74) *Attorney, Agent, or Firm*—Blakely, Sokoloff, Taylor & Zafman LLP (57) ABSTRACT

A method and apparatus for calibrating sensors of a tool positioning mechanism on a mobile machine are provided. The mobile machine includes a tool, a tool positioning mechanism having a plurality of sensors for providing signals indicative of the physical configuration of the mechanism, a satellite positioning system, and a plurality of positioning system antennas. One of the antennas is detachably mounted on the tool while an other antenna is mounted to a location on the machine other than on the tool. With the positioning mechanism configured so that the tool is at its maximum height, the satellite positioning system is operated to acquire real-time kinematic (RTK) data from the antennas and to process the RTK data to precisely determine the position of the tool. The sensors are then calibrated based on the precisely determined position of the tool.

35 Claims, 4 Drawing Sheets

U.S. PATENT DOCUMENTS

| | | |
|---|---|---|
| 4,225,226 | 9/1980 | Davidson et al. . |
| 4,231,700 | 11/1980 | Studebaker . |
| 4,600,997 | 7/1986 | Cain et al. . |
| 4,653,910 | 3/1987 | Poling . |
| 4,674,870 | 6/1987 | Cain et al. . |
| 4,676,634 | 6/1987 | Petersen . |
| 4,732,471 | 3/1988 | Cain et al. . |
| 4,733,355 | 3/1988 | Davidson et al. . |
| 4,756,617 | 7/1988 | Cain et al. . |
| 4,767,208 | 8/1988 | Cain et al. . |
| 4,805,086 | 2/1989 | Nielsen et al. . |
| 4,807,131 | 2/1989 | Clegg . |
| 4,829,418 | 5/1989 | Nielsen et al. . |
| 4,830,489 | 5/1989 | Cain et al. . |
| 4,888,890 | 12/1989 | Studebaker et al. . |
| 4,895,440 | 1/1990 | Cain et al. . |
| 4,914,593 | 4/1990 | Middleton et al. . |
| 4,924,374 | 5/1990 | Middleton et al. . |
| 4,926,948 | 5/1990 | Davidson et al. . |
| 5,076,690 | 12/1991 | deVos et al. . |
| 5,078,215 | 1/1992 | Nau . |
| 5,107,932 | 4/1992 | Zachman et al. . |
| 5,137,354 | 8/1992 | deVos et al. . |
| 5,184,293 | 2/1993 | Middleton et al. . |
| 5,235,511 | 8/1993 | Middleton et al. . |
| 5,243,398 | 9/1993 | Nielsen . |
| 5,327,345 | 7/1994 | Nielsen et al. . |
| 5,334,987 | 8/1994 | Teach . |
| 5,375,663 | 12/1994 | Teach . |
| 5,465,493 | 11/1995 | Sobottke et al. . |
| 5,477,459 | 12/1995 | Clegg et al. . |
| 5,519,620 | 5/1996 | Talbot et al. . |
| 5,559,725 | 9/1996 | Nielson et al. . |
| 5,572,809 | 11/1996 | Steenwyk et al. . |
| 5,583,685 | 12/1996 | Ohtomo et al. . |
| 5,621,531 | 4/1997 | Van Andel et al. . |
| 5,638,220 | 6/1997 | Ohtomo et al. . |
| 5,689,330 | 11/1997 | Gerard et al. . |
| 5,711,022 | 1/1998 | Steenwyk . |
| 5,742,069 | 4/1998 | Steenwyk et al. . |
| 5,751,459 | 5/1998 | Ohtomo et al. . |

FOREIGN PATENT DOCUMENTS

| | | |
|---|---|---|
| 0257525 | 3/1988 | (EP) . |
| 0262764 | 4/1988 | (EP) . |
| 0346043 | 12/1989 | (EP) . |
| 0346044 | 12/1989 | (EP) . |
| 0349132 | 1/1990 | (EP) . |
| 0358368 | 3/1990 | (EP) . |
| 0369694 | 5/1990 | (EP) . |
| 0405725 | 1/1991 | (EP) . |
| 0426287 | 5/1991 | (EP) . |
| 0452974 | 10/1991 | (EP) . |
| 0452975 | 10/1991 | (EP) . |
| 0457548 | 11/1991 | (EP) . |
| 0223043 | 1/1992 | (EP) . |
| 0468677 | 1/1992 | (EP) . |
| 0501616 | 9/1992 | (EP) . |
| 0219767 | 12/1992 | (EP) . |
| 0542015 | 5/1993 | (EP) . |
| 0349132 | 8/1993 | (EP) . |
| 0346044 | 1/1994 | (EP) . |
| 0358368 | 4/1994 | (EP) . |
| 0426287 | 4/1994 | (EP) . |
| 0452974 | 1/1995 | (EP) . |
| 0452975 | 12/1995 | (EP) . |
| 0468677 | 5/1996 | (EP) . |
| 0457548 | 7/1996 | (EP) . |

METHOD AND APPARATUS FOR CALIBRATING A TOOL POSITIONING MECHANISM ON A MOBILE MACHINE

FIELD OF THE INVENTION

The present invention pertains to systems for controlling the positioning of a tool on a mobile machine. More particularly, the present invention relates to a technique for calibrating a mechanism for positioning a tool on a mobile machine.

BACKGROUND OF THE INVENTION

Mobile machines such as excavators, bulldozers, and graders are commonplace in applications such as construction and mining. These machines include a tool, such as a bucket or a blade, which is positioned by a tool positioning mechanism under the control of a human operator or an on-board tool control system. For example, referring to FIG. 1, which shows an excavator 1, the tool may be a bucket 2, and the tool positioning mechanism 3 may comprise an arm 5 and a boom 6, to which the bucket 2 is mounted.

To allow accurate positioning of the tool, an on-board tool control or guidance system may require precise knowledge of the position of the tool relative to a reference position, such as the ground level. Accordingly, on machines such as those mentioned above, the tool positioning mechanism sometimes is equipped with linear or angular position encoders or other similar sensors. The outputs of the encoders are provided to the tool control system to indicate the physical configuration of the positioning mechanism and the position of the tool. A common problem is that, over time, position inaccuracy tends to accumulate in the linkages of the tool positioning mechanism. This inaccuracy tends to be reflected in the outputs of the encoders. Because the outputs of the encoders can be crucial in positioning the tool, it may be desirable to calibrate the encoders before beginning a task, to ensure that the tool control system uses reliable data. The encoders may be calibrated by setting their outputs to a known value when the position of the tool is precisely known, relative to a reference (e.g., the ground level).

One possible calibration approach involves distributing a number of stakes or other similar reference points around the job site, each of which has a visible mark at a precisely known height. The machine is driven close to a stake, the tool is aligned with the mark, and the tool positioning system is then calibrated. This approach is undesirable, however, because it requires time and manpower to survey the stakes. In addition, the tool positioning system can only be calibrated when the machine is located next to one of the stakes.

Another calibration technique uses a laser beam at a fixed, precisely known height as a reference level. The laser beam is detected by a photosensor on-board the machine. The use of a laser beam, however, is subject to line of sight limitations. Thus, obstacles on the job site can hinder calibration of the tool control system when such a technique is used.

What is desired, therefore, is a technique for calibrating a tool positioning system on a mobile machine which overcomes these and other disadvantages. In particular, what is desired is a technique for calibrating a tool positioning system on a mobile machine in a stakeless environment without the line of sight limitations associated with

SUMMARY OF THE INVENTION

The present invention includes a method and apparatus for calibrating a tool positioning mechanism on a mobile unit. A mobile unit includes a tool, a mechanism for positioning the tool, a sensor, a positioning system, and a processor. The positioning system is configured to acquire positioning data while the mechanism is in a predetermined configuration and to precisely determine the position of the tool. The sensor provides signals which indicate the physical configuration of the mechanism. The processor is configured to cause the sensor to be calibrated based on the precisely determined position of the tool.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for calibrating a tool positioning mechanism on a mobile machine are described. As described in greater detail below, in one embodiment the mobile machine includes a tool, a tool positioning mechanism, and an on-board processing system including a satellite positioning system and two positioning system antennas. The tool positioning mechanism has a number of sensors for indicating the physical configuration of the mechanism and which are to be calibrated. Prior to calibration, one of the antennas is temporarily mounted to the tool while the other antenna is mounted to a location on the machine other than on the tool. The positioning mechanism is then configured so that the tool is at its maximum height, and the satellite positioning system is operated to acquire real-time kinematic (RTK) data from both antennas. The RTK data is processed to precisely determine the height of the tool. The sensors are then calibrated based on the precisely determined height of the tool. Hence, the described method and apparatus allow calibration of a tool positioning mechanism on a mobile machine in a stakeless environment without the line of sight limitations associated with lasers.

Figure 1:
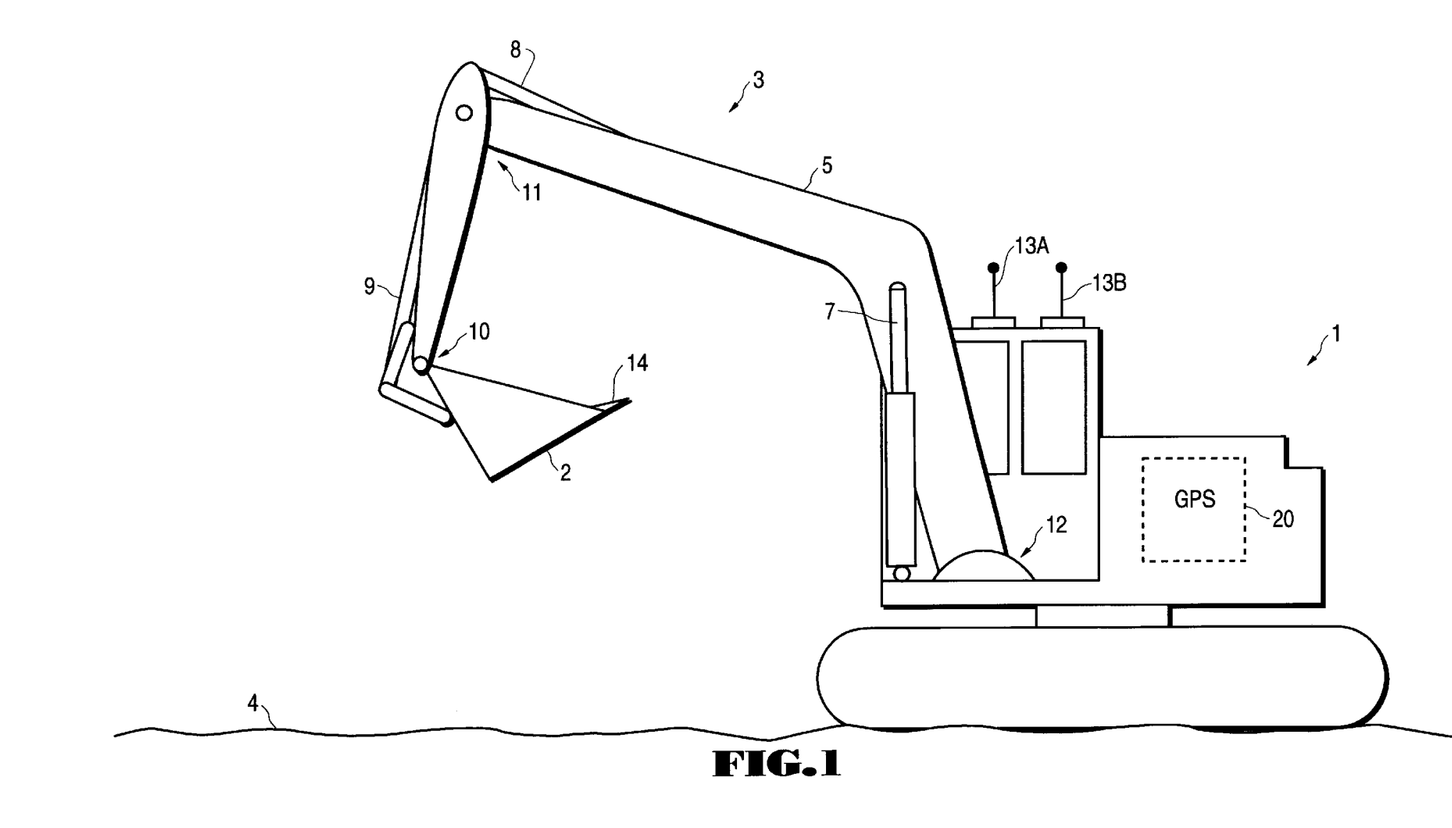
FIG. 1 shows an excavator having a positionable bucket and dual positioning system antennas.

Refer now to FIG. 1, which shows an excavator 1 having a positionable tool 2 (i.e., a bucket) attached to a tool positioning mechanism 3. The tool positioning mechanism 3 includes an arm 5 coupled to the cab of the excavator 1 and a boom 6 coupled to the arm 5 and to the bucket 2. On-board the excavator 1 is a processing system (not shown), which includes a tool control and/or guidance system (hereinafter simply "tool control system") for controlling operation of the tool positioning mechanism 3 and the tool 2. The calibration technique described herein enables the height of the teeth 14 of bucket 2 to be precisely determined relative to the ground level 4 in order to accurately calibrate the tool positioning mechanism 3.

The tool positioning mechanism 3 includes a number of linear or angular position encoders or other similar sensors (not shown), which output signals indicating the physical configuration of the tool positioning mechanism 3 to the on-board tool control system. The encoders may be positioned at various locations along the arm 5, the boom 6, the bucket 2. The encoders may indicate, for example, the linear positions of linkages 7, 8 and 9, or the angles of joints 10, 11, and 12, to indicate how the tool positioning mechanism 3 is currently positioned. Hence, the outputs of the encoders together indicate the extent to which the arm 5 and the boom 6 are extended or raised and thus indicate the position of the bucket 2.

The information output by the encoders may be used by the on-board tool control system for automatically positioning the bucket 2 or for guiding an operator in manually positioning the bucket 2. For example, the on-board processing system may have access to a digital terrain model (DTM) specifying design elevations for various locations on the job site. The on-board processing may further include a precise positioning system, such as a Global Positioning System (GPS) receiver system 20, as illustrated in FIG. 1. The on-board processing system may use data from the DTM and position data from the positioning system 20 to position the bucket 2 or to provide guidance to the operator in manually positioning the bucket 2.

Because data from the encoders may be critical to precisely positioning the bucket 2, it may be desirable to calibrate the encoders before performing a task with the machine 1. Calibration may be performed by setting the output signals of the encoders to a predetermined value when the bucket 2 is in a precisely known position while the tool positioning mechanism 3 is in a precisely known configuration. Therefore, to calibrate the encoders, their outputs are set to a predetermined value (e.g., zero or full-range) when the positioning mechanism 3 is configured so that the teeth 14 of the bucket 2 are at their maximum height above ground level 4.

Figure 2:
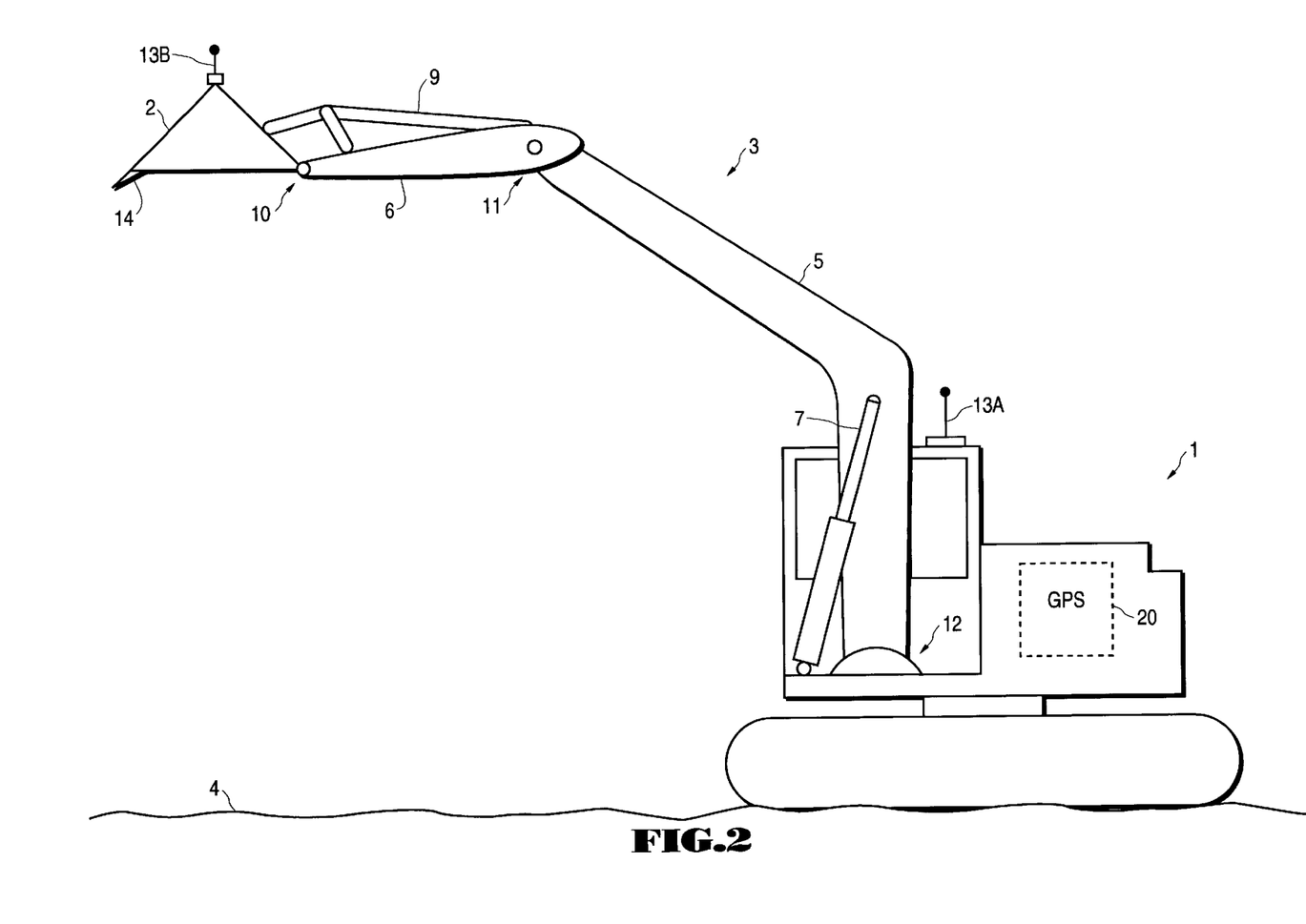
FIG. 2 illustrates an excavator with the cutting edge of the bucket extended to its maximum height.

Accordingly, in one embodiment, the GPS positioning system 20 in the excavator 1 is a Real-Time Kinematic (RTK) GPS positioning system, which is used to accurately calibrate the tool positioning mechanism 3, in addition to providing position and heading data for the excavator 1. As shown in FIG. 1, the excavator 1 is further equipped with two GPS antennas, 13A and 13B, which are coupled to provide data to the positioning system 20. During normal operation of the machine, antennas 13A and 13B are mounted at precisely known locations on the cab of the excavator 1 and may be used by the positioning system 20 to determine the position and/or heading of the excavator 1. Antenna 13B is detachably mounted to the cab. When calibration of the tool positioning mechanism 3 is desired, antenna 13B is detached from the cab and temporarily mounted to a durable, inexpensive, and permanent antenna mount located on the back side of the bucket 2, as shown in FIG. 2.

Figure 4:
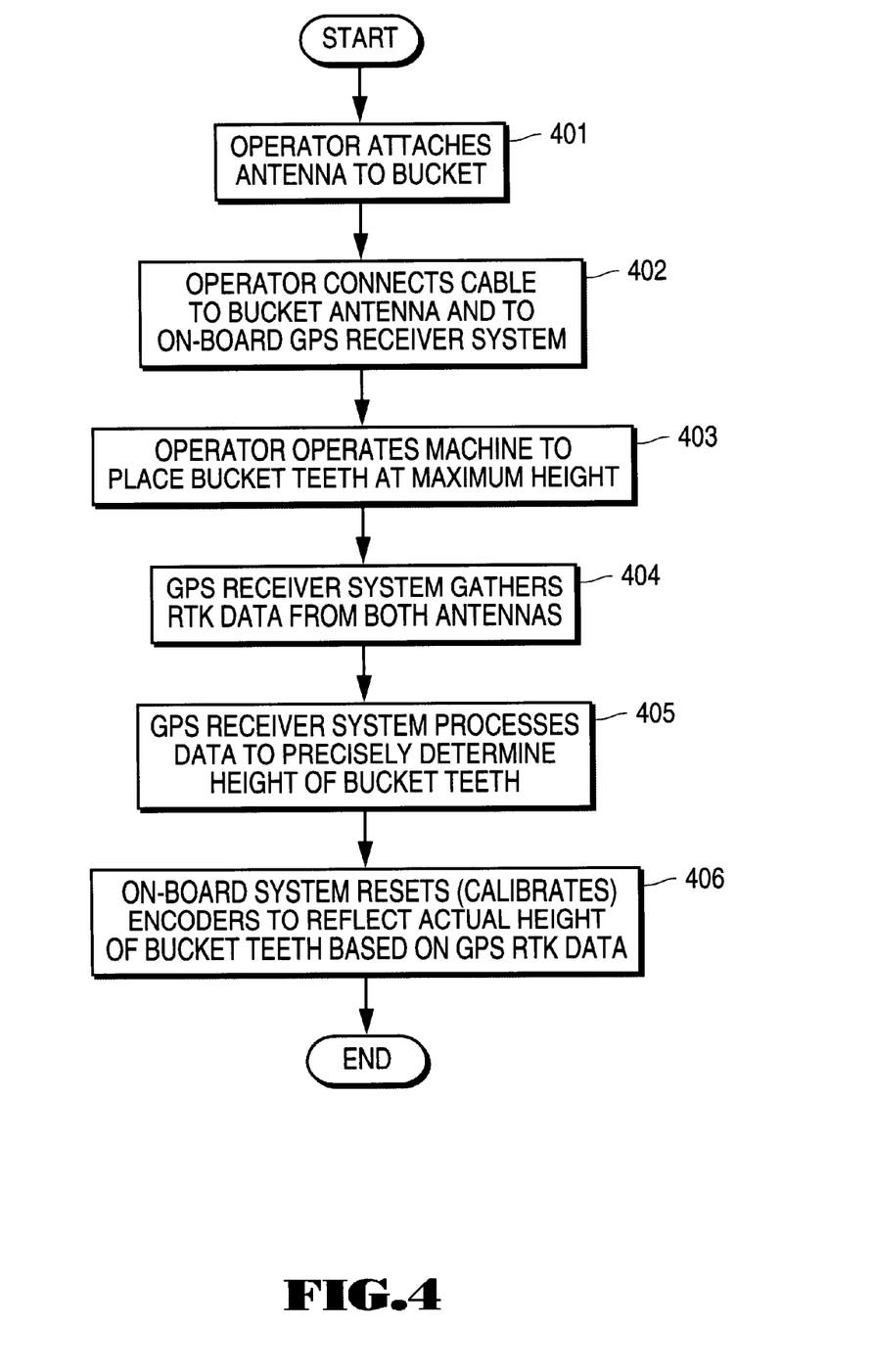
FIG. 4 is a flow diagram illustrating a routine for calibrating the positioning mechanism of a mobile machine.

The antenna mount on the bucket 2 is needed only during calibration of the tool positioning system 3. Reference is now made to FIG. 4, which illustrates a flow diagram of a routine for calibrating the tool positioning mechanism 3. With the bucket 2 positioned on or near the ground level 4, the operator of the excavator 1 or an assistant mounts antenna 13B to the antenna mount on the back side of the bucket at block 401. Next, at block 402 the operator or assistant connects a service cable (not shown) between the bucket antenna 13B and the on-board GPS system 20. After the cable is connected, at block 403 the operator operates the machine to place the boom 6 and arm 5 in their fully extended positions, as shown in FIG. 2, such that the teeth 14 of bucket 2 are at their maximum height above the ground level 4. With the machine stationary, the on-board positioning system 20 is then operated (in response to a start signal) at block 404, to simultaneously gather RTK data from antenna 13A and antenna 13B using the same or multiple GPS base stations. At block 405, the GPS receiver system 20 processes the data to precisely determine the height of the teeth 14 above the ground level 4. Note that the processing of the RTK data in block 405 may be performed concurrently with acquisition of the data in block 404. The excavator 1 and the tool positioning mechanism 3 are allowed to remain static for a period of time (e.g., 10 to 15 minutes) sufficient to resolve the vectors down to a specified degree of accuracy, such as a specified number of centimeters or millimeters. In one embodiment, the processing of the data includes resolving a vector between antennas 13A and 13B to reduce noise in the position calculation.

Once the GPS system 20 recognizes that sufficient time has elapsed, at block 406 the on-board processing system calibrates the encoders associated with the positioning mechanism 3. Calibration is accomplished by setting the outputs of the encoders to a predetermined value, such as zero or full-range, which is defined to correspond to the tool positioning mechanism 3 being in its fully extended configuration and the (now known) exact height of the bucket teeth 14. Firmware in the on-board processing system may be used to account for position offsets between the bucket-mounted antenna 13B and the bucket teeth 14. An audible alarm or light or other indication may be used to indicate to the operator when calibration is complete.

Figure 3:
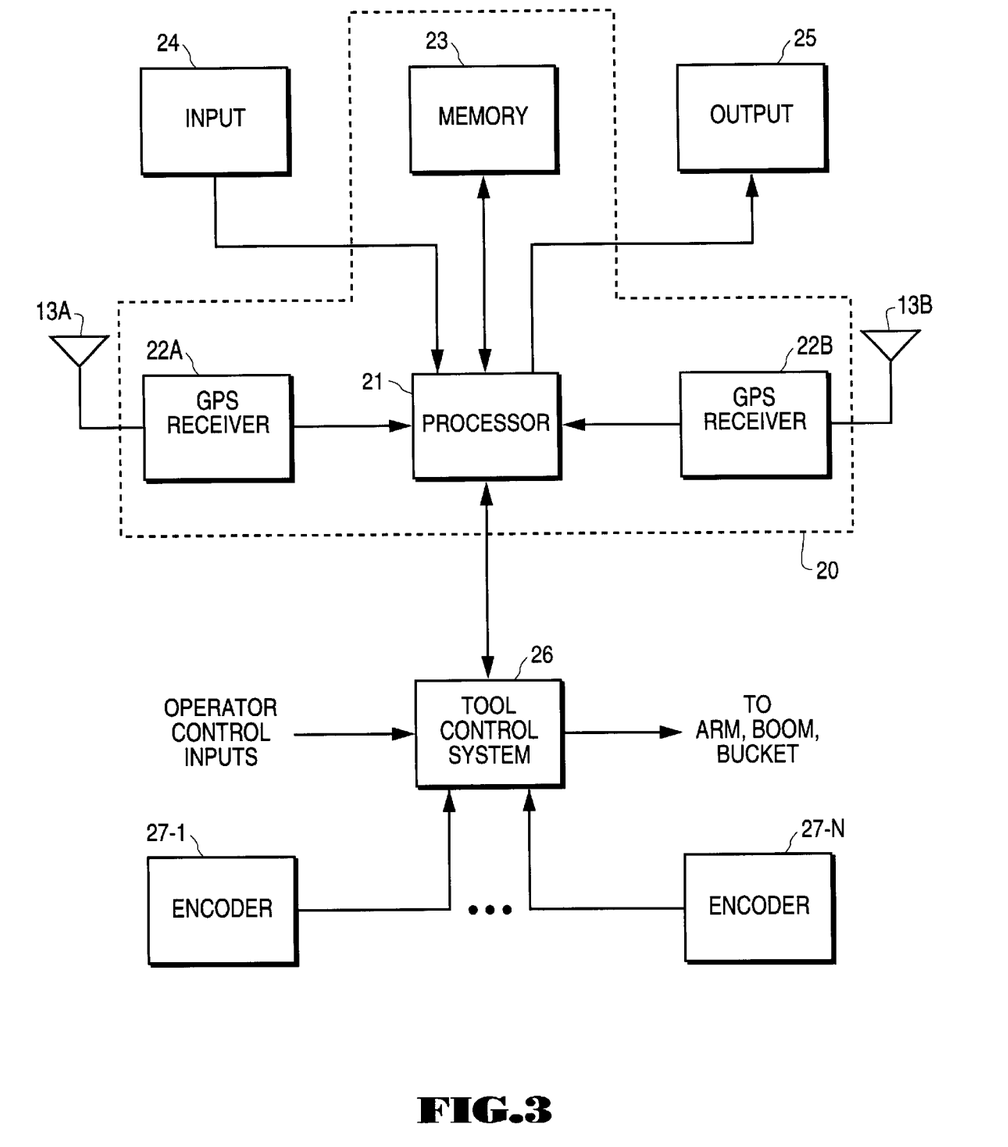
FIG. 3 illustrates a processing system on-board a mobile machine, according to one embodiment.

Refer now to FIG. 3, which is a block diagram of the on-board processing system, according to one embodiment. The on-board processing system includes the GPS receiver system 20, which is coupled to the tool control system 26, to an input device 24, and to an output device 25. The tool control system 26 is coupled to control the tool positioning mechanism 3 and the bucket 2. Such control may be in response to manual inputs from the operator or it may be automatic control, as described above. The tool control system 26 receives inputs from the above-described position encoders 27-1 through 27-N, indicating the physical configuration of the tool positioning mechanism 3 and bucket 2.

In the illustrated embodiment, the GPS receiver system 20 includes a processor 21, a memory coupled to the processor 21, and dual GPS receivers 22A and 22B coupled to the processor 21 and respectively coupled to antennas 13A and 13B. One example of a GPS-RTK receiver that is believed to be suitable for purposes of the present invention is the dual-frequency MS750 RTK receiver, available from Trimble Navigation Limited of Sunnyvale, Calif. Processor 21 controls the overall operation of the GPS system 20 and coordinates flow of control signals and data between the various components of the system. In addition, processor 21 may also process the RTK data to compute the position of the bucket teeth for purposes of calibrating the encoders 27-1 through 27-N. Processor 21 may be, or may include, a general-purpose or special-purpose microprocessor, application specific integrated circuit (ASIC), field-programmable gate ray (FPGA), or other similar device or devices, or a combination of such devices. Memory 23 may be used to store positioning data and other types of data, and also to store program instructions executable by processor 21. Accordingly, memory 21 may be, or may include, any combination of any type of Random Access Memory (RAM), Read-Only Memory (ROM), or mass storage device. The input device 24 may represent one or more controls of various different types, including switches, buttons, and alphanumeric keys. Output device 25 may represent one or more output devices of various types, including simple lights, alphanumeric displays, cathode ray tubes (CRTs), light-emitting diodes (LEDs), liquid crystal displays (LCDs), and the like.

Note that many variations on the embodiment of FIG. 3 are possible. For example, a single GPS receiver coupled to both antennas 13A and 13B may be used in place of the two receivers 22A and 22B. Also, a GPS receiver may be equipped to perform the functions of processor 21, such that the separate processor 21 can be omitted.

It should also be noted that, in other embodiments, the GPS receiver system 20 may be replaced or supplemented by another type of satellite positioning system, such as the global navigation system (GLONASS) established by the former Soviet Union. In still other embodiments, the GPS system 20 may be replaced or supplemented by any other high-accuracy positioning system suitable for performing the above-described functions, which does not necessarily have to be based on a satellite positioning system. For example, an Inertial Navigation System (INS) or pseudolite positioning system may be used in place of, or in conjunction with, GPS system 20.

Thus, a method and apparatus for calibrating a tool positioning mechanism on a mobile machine have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A mobile unit comprising:
   a tool;
   a mechanism for positioning the tool;
   a sensor providing signals indicative of a physical configuration of the mechanism;
   a satellite positioning system configured to acquire positioning data while the mechanism is in a predetermined configuration and to precisely determine the position of the tool; and
   a processor configured to cause the sensor to be calibrated based on a position of the tool determined by the satellite positioning system.

2. A mobile unit as recited in claim 1, further comprising a plurality of antennas coupled to the satellite positioning system, wherein the positioning data is associated with the plurality of antennas.

3. A mobile unit as recited in claim 2, wherein one of the plurality of antennas is mounted to the tool and another of the plurality of antennas is mounted to a location on the machine other than on the tool.

4. A mobile unit as recited in claim 2, wherein the positioning data comprises real-time kinematic (RTK) data.

5. A mobile unit as recited in claim 2, wherein the satellite positioning system is further configured to compute a vector between the first and second antennas to precisely determine the position of the tool.

6. A mobile machine comprising:
   a tool;
   a mechanism for positioning the tool;
   a sensor providing signals indicative of a physical configuration of the mechanism;
   a positioning system operable to acquire positioning data while the mechanism is in a predetermined configuration;
   means for processing the positioning data to precisely determine the position of the tool; and
   means for calibrating the sensor based on the precisely determined position of the tool.

7. A mobile machine as recited in claim 6, wherein the positioning system comprises a satellite positioning system.

8. A mobile machine as recited in claim 6, further comprising a plurality of antennas coupled to the positioning system, wherein the positioning data is associated with each of the plurality of antennas.

9. A mobile machine as recited in claim 8, wherein one of the plurality of antennas is mounted to the tool and another of the plurality of antennas is mounted to a location on the machine other than on the tool.

10. A mobile machine as recited in claim 6, wherein the positioning data comprises real-time kinematic (RTK) data.

11. A mobile machine as recited in claim 6, wherein said means for processing the positioning data to precisely determine the position of the tool comprises means for computing a vector between the first and second antennas.

12. A mobile machine comprising:
    a tool;
    a mechanism for positioning the tool;
    a plurality of sensors providing signals indicative of a physical configuration of the mechanism;
    a plurality of positioning system antennas;
    a positioning system configured to acquire real-time kinematic (RTK) data associated with each of the antennas while the mechanism is in a predetermined configuration and to precisely determine the position of the tool based on the RTK data; and
    a processor configured to cause the sensors to be calibrated based on the precisely determined position of the tool.

13. A mobile machine as recited in claim 12, wherein one of the plurality of antennas is mounted to the tool and another of the plurality of antennas is mounted to a location on the machine other than on the tool.

14. A mobile machine as recited in claim 12, further comprising means for precisely determining the position of the tool based on a computed vector between the plurality of antennas.

15. A mobile machine as recited in claim 12, wherein the positioning system comprises a satellite positioning system.

16. A mobile machine comprising:
    a tool;
    means for positioning the tool;
    a plurality of sensors providing signals indicative of a physical configuration of the means for positioning the tool;
    a first antenna mounted to the tool;
    a second antenna mounted to the machine at a location other than on the tool;
    processing means coupled to the first and second antennas for acquiring real-time kinematic (RTK) data associated with the first and second antennas while the means for positioning the tool is in a predetermined configuration and for precisely determining the position of the tool based on the RTK data; and calibration means for calibrating the sensors based on the precisely determined position of the tool.

17. A mobile machine as recited in claim 16, wherein the processing means comprises means for precisely determining the position of the tool based on a computed vector between the plurality of antennas.

18. A mobile machine as recited in claim 16, wherein the processing means comprises a satellite positioning system.

19. In a mobile unit equipped with a tool and a mechanism for positioning the tool, a method of calibrating the mechanism, the mechanism having a plurality of sensors providing signals indicative of a physical configuration of the mechanism, the method comprising:

using an on-board satellite positioning system to acquire positioning data while the mechanism is in a predetermined configuration;

processing the positioning data to precisely determine the position of the tool; and calibrating the sensors based on the precisely determined position of the tool.

20. A method as recited in claim 19, wherein said using the on-board satellite positioning system to acquire positioning data comprises using the on-board satellite positioning system to acquire data associated with a plurality of on-board antennas.

21. A method as recited in claim 20, wherein said processing the positioning data to precisely determine the position of the tool comprises computing a vector between the first and second antennas.

22. A method as recited in claim 20, wherein one of the plurality of antennas is mounted to the tool and another of the plurality of antennas is mounted to a location on the machine other than on the tool.

23. A method as recited in claim 20, wherein said using the on-board satellite positioning system to acquire positioning data comprises using the on-board satellite positioning system to acquire real-time kinematic (RTK) data.

24. In a mobile machine equipped with a tool and a mechanism for positioning the tool, a method of calibrating the mechanism, the mechanism having a plurality of sensors for providing signals indicative of a physical configuration of the mechanism, the machine further equipped with a satellite positioning system coupled to first and second antennas, one of the first and second antennas mounted to the tool, the other of the first and second antennas mounted to a location on the machine other than on the tool, the method comprising:

using the positioning system to acquire data associated with both the first and second antennas while the mechanism is in a predetermined configuration;

processing the data to precisely determine the height of the tool; and calibrating the sensors based on the precisely determined height of the tool.

25. A method as recited in claim 24, wherein the data comprises real-time kinematic (RTK) data.

26. A method as recited in claim 24, wherein said processing the data to precisely determine the height of the tool comprises computing a vector between the first and second antennas.

27. A method as recited in claim 24, wherein the positioning system comprises a Global Positioning System (GPS) receiver system.

28. In a mobile machine equipped with a tool and a mechanism for positioning the tool, a method of calibrating the mechanism, the mechanism having a plurality of sensors for providing signals indicative of a physical configuration of the mechanism, the machine further equipped with a satellite positioning system coupled to first and second antennas, one of the first and second antennas mounted to the tool, the other of the first and second antennas mounted to a location on the machine other than on the tool, the method comprising:

operating the receiver system to acquire real-time kinematic (RTK) data associated with both the first and second antennas while the mechanism is in a predetermined configuration;

operating the receiver system to process the RTK data to precisely determine the position of the tool; and operating an on-board tool control system to calibrate the sensors based on the precisely determined position of the tool.

29. A method as recited in claim 28, wherein said using the GPS receiver system to process the RTK data to precisely determine the position of the tool comprises operating the GPS receiver system to compute a vector between the first and second antennas.

30. A method as recited in claim 28, wherein the receiver system comprises a Global Positioning system receiver system.

31. In a mobile machine equipped with a tool and a mechanism for positioning the tool, a method of calibrating the mechanism, the mechanism having a plurality of sensors for providing signals indicative of a physical configuration of the mechanism, the machine further equipped with a first positioning system antenna coupled to a positioning system receiver system, the first positioning system antenna mounted to the machine in a location other than on the tool, the method comprising:

attaching a second positioning system antenna to the tool;

coupling the second positioning system antenna to the receiver system;

placing the mechanism in a predetermined configuration;

using the receiver system to acquire data associated with both the first and second antennas while the mechanism is in the predetermined configuration;

using the receiver system to process the data to precisely determine the height of the tool; and using an on-board tool control system to calibrate the sensors based on the precisely determined height of the tool.

32. A method as recited in claim 31, wherein the data comprises real-time kinematic (RTK) data.

33. A method as recited in claim 31, wherein said using the GPS receiver system to process the data to precisely determine the height of the tool comprises operating the GPS receiver system to compute a vector between the first and second antennas.

34. A method as recited in claim 31, wherein the receiver system comprises a satellite positioning system receiver system.

35. In a mobile machine equipped with a tool and a mechanism for moving the tool, a method of calibrating the mechanism, the mechanism having a plurality of sensors for providing data indicative of a physical configuration of the mechanism, the machine further equipped with a first Global Positioning System (GPS) antenna coupled to a GPS receiver system, the first GPS antenna mounted to the machine in a location other than on the tool, the method comprising:

attaching a second GPS antenna to the tool;

coupling the second GPS antenna to the GPS receiver system;

operating the mechanism to position the tool at a maximum height;

using the GPS receiver system to acquire real-time kinematic (RTK) data associated with both the first and second antennas while the tool is extended to the maximum height;

using the GPS receiver system to process the RTK data to precisely determine the height of the tool, including operating the GPS receiver system to compute a vector between the first and second antennas; and using an on-board tool control system to calibrate the sensors based on the precisely determined height of the tool.

* * * * *